3,046,126
Patented July 24, 1962

3,046,126

LIGHT SENSITIVE MATERIAL AND PROCESS

Oskar Süs, Wiesbaden-Biebrich, and Martin Glos, Wiesbaden, Germany, assignors, by mesne assignments, to Azoplate Corporation, Murray Hill, N.J.

No Drawing. Filed Feb. 20, 1956, Ser. No. 566,326
Claims priority, application Germany Mar. 2, 1955
42 Claims. (Cl. 96—35)

The present invention relates to the field of making duplicates by way of a photomechanical process. More particularly it is concerned with a reproduction material comprising a layer made of an organic colloid with a new light-sensitive organic compound uniformly distributed in said layer.

In the photomechanical reproduction art, light-sensitive colloidal layers have been used to prepare the printing elements necessary for the process of reproduction, i.e. printing plates, clichés etc. The light-sensitive colloidal layers are caused to tightly adhere to layer-supports, and from said light-sensitive colloidal layers, tanned images are produced which, then, in connection with the support, can be used, for instance, directly as printing plates or indirectly, e.g. via a cliché, for the production of copies.

The light-sensitive substance present in the colloidal layer when it is struck by light, forms light-transformation products which have a tanning or hardening influence on the colloid comprised in the layer, and thereby a tanned image is obtained. It is obvious that this tanned image must be a negative of the pattern under which the exposure of the light-sensitive colloidal layer takes place. The most frequently used light-sensitive substances are dichromates. One of the disadvantages in the use of dichromates is the poor stability and short lifetime of the light sensitive colloidal layer. Another disadvantage is that dichromate-sensitized layers are rather dangerous to handle. For that reason many other light sensitive substances have been proposed for their application in colloidal layers, i.e. certain high molecular diazo compounds, aromatic nitro compounds and also organic azido compounds. Nevertheless, no acceptable substitute has been found, and the need for a colloid sensitizer other than the dichromates has not been satisfied.

It is one object of the present invention to provide a new reproduction material and process employing such material consisting of a layer support and a light sensitive layer free from dichromates. A further object of the invention is to provide a reproduction material characterized by the fact that it contains as the light sensitive substance certain thiophene compounds which are nitrated in the thiophene ring itself.

The light sensitive substances used according to this invention in the colloid layer are thiophene bodies, nitrated in the thiophene ring and wherein the nitro group present in the molecule is linked directly to the thiophene nucleus. In addition to the nitro-thiophene itself, there may be used substitution products of nitro-thiophene and also condensed bodies having a nitrated thiophene ring, i.e. 2- or 3-nitro thionaphthene and its substitution products.

Thiophene itself does not exhibit any light sensitivity, and it was quite surprising for us to find that nitrothiophene, the simplest compound of the group of the invention, was light sensitive. The nitro group must therefore be regarded as the photoactive group in the molecule, since the thiophene substitution products which do not contain any nitro group, are insensitive to light. It was very surprising to find that substituents normally producing no photoactivity are able to increase the light sensitivity of the nitro-substituted thiophenes and nitro-substituted thionaphthenes. Particularly effective with regard to an increase of light-sensitivity are the halogen atoms.

Of particular technical importance was our determination that the compounds used according to this invention are universally applicable in all colloids used for the production of the light sensitive layers. Customarily used colloids, some of which are the natural substances such as gelatin, gum arabic, etc. as well as partly synthetic high molecular products, such as the polymers of monomeric vinyl compounds, e.g. vinylpyrrolidone or styrene, are well suited for use with the thiophene compounds of the invention.

The compounds to be used according to the invention are per se described in the literature, or can be obtained by the analogous use of well known methods of preparation.

For photosensitizing colloids which are insoluble in water, but soluble in organic solvents, such nitrothiophenes and nitro-thionaphthenes are preferred which are soluble in organic solvents, but insoluble in water. By means of such combinations light-sensitive layers are obtained, which are suitable for the production of colloid images that are very resistant to etching. Metal surfaces, i.e. copper plates or copper cylinders, can be directly coated with these mixtures of colloid/light-sensitive substance referred to, above, and printing plates can be produced. The use of transfer paper without the application of reproduction paper is dispensed with. By the process of the invention, a simplified method is obtained for the production of printing plates, e.g. those used in copper intaglio printing. Compounds containing groups which increase the water-solubility of the layer are well suited to be used in combination with water-soluble colloids.

As layer supports for the colloid layers built up in accordance with the present invention, all supports customary in the photomechanical reproduction are suitable, i.e. metals, paper, plastic films or plastic foils. Advantageously, the colloids are coated onto the support together with the light-sensitive substances by means of whirlcoating, pouring-on or spraying-on from organic or aqueous solutions. The light-sensitive reproduction material is produced according to the invention, by mixing a solution of the colloid to be used with the nitrated thiophene body, preferably a solution of the respective nitrothiophene body, and coating the light sensitive mixture on the layer support; where it is then dried to form a layer. It is also possible to sensitize a colloidal layer, i.e. a gelatin layer, after its final formation, by means of a nitrothiophene body by immersing the gelatin layer for some time into a solution of the nitrothiophene body and drying the layer.

Tanned images are obtained by exposing the light sensitive layer under a pattern and developing it afterwards. Developing is accomplished by removing the colloid from the non-light struck areas together with the light sensitive substance finely distributed therein by washing or swabbing with water or organic solvents. The hardened image forming colloid remains at the places struck by light. From an original, an inverted tanned image is obtained from which, according to procedures known in the reproduction industry, printing plates can be produced.

According to one method of the invention, after the developed image is treated with dilute acid, copies for flat and offset printing can be made directly from an image produced on metal, for example aluminum. Even higher runs can be obtained by heating the metal foil for a short period to a temperature of about 250–300° C.

According to another method of the invention, if a positive printing is intended to be made from a positive original, the developed image is etched with an etching agent, e.g. nitric acid or ferric chloride, and then transformed into an oleophilic lacquer image, by known methods.

This latter method also allows for the production of clichés, which are suitable as blocks for surface printing when zinc plates are used as supports. In such a case the etching process is carried out with an etching agent of sufficient etching power, or extended over a long time.

According to another method of the invention the images produced on gelatin paper are transferred onto copper intaglio printing cylinders or plates.

The following compounds are discussed in further detail in the examples:

(1)

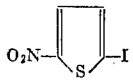

(2)

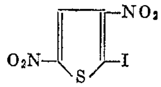

(3)

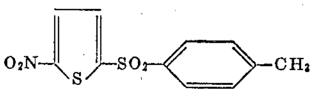

(4)

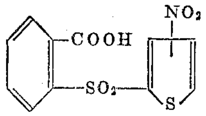

(5)

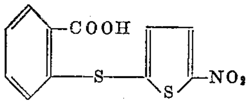

(6)

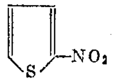

(7)

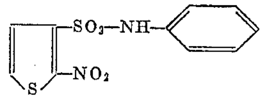

(8)

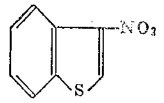

(9)

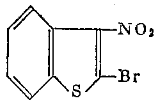

(10)

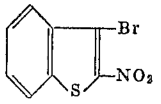

(11)

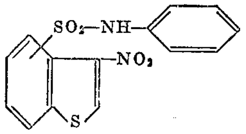

(12)

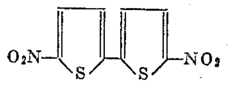

(13)

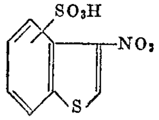

(14)

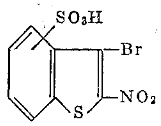

(15)

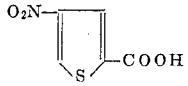

(16)

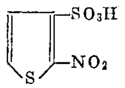

(17)

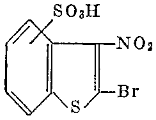

(18)

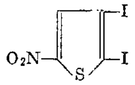

(19)

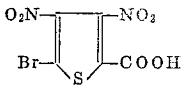

(20)

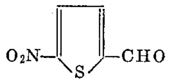

The following examples are inserted for the purpose of illustrating the present invention. It is not intended to restrict the scope of the invention to the contents of the examples.

EXAMPLES (1) 25 cc. of a 4% solution of polyvinylpyrrolidone, e.g. of the product sold by Badische Anilin- und Soda-Fabrik AG., Ludwigshafen (Rhine), under the registered trademark "Collacral K," in ethanol (80%) are mixed with a solution of 0.1 g. of 2-iodo-5-nitro-thiophene (corresponding to Formula 1) in 25 cc. of ethanol (80%). By using a plate-whirler of the kind generally applied in the printing art, a mechanically roughened aluminum foil is coated with this mixture and then dried by a warm air-current. The sensitized foil is now exposed to light under a transparent film-pattern, for 1–2 minutes under a closed arc-lamp of 18 amperes and at distance of 70 cm. During this process the areas of the light-sensitive polyvinylpyrrolidone-layer struck by light become gradually brown, so that a clear negative image is obtained. The foil is now rinsed in a 4% aqueous solution of naphthol-green (see Schultz, Farbstofftabellen, 7th edition, vol. 1, No. 5, page 7) or of crystal-violet (see Schultz, Farbstofftabellen, 7th edition, vol. 1, page 329, No. 785) for a short period and then washed off with a weak jet of water. The image-parts formed by the light-hardening of the colloid are colored in a green or violet color, while the colloid is rinsed off at the areas non-struck by light. The background of the image is cleaned by slightly swabbing it with a moistened cotton pad, and the foil is then dried by a warm air-current. A negative image can be obtained from a positive pattern and vice-versa.

The adhesion of the image on the metallic support can be essentially improved by heating the foil for 10–15 minutes to 250–300° C. A particularly high run of copies can be obtained from such an aftertreated foil, which is used as a printing plate.

A positive printing plate is obtained from a positive pattern, if the developed foil is etched in known manner with a ferric chloride solution and coated with a thin varnish layer after rinsing it with water and drying. By mechanically rubbing the varnished foil under water the colloid layer is removed from the foil, that is, the negative colloid image is removed. During the following inking with greasy ink only the lacquer at the etched areas accepts color.

Equally good results are obtained by replacing 2-iodo-5-nitrothiophene by one of the following compounds:

*3,5-Dinitro-2-Iodo-Thiophene (Formula 2) or 5-Nitro-2-(p-Toluene-Sulfonyl)-Thiophene (Formula 3)*

The compound of Formula 3 is produced as follows: 7.5 g. of 2-iodi-5-nitrothiophene and 10 g. of the sodium salt of p-toluene-sulfinic acid are heated for 2 hours in a mixture of 75 cc. of water and 75 cc. of dioxane. The solution thus obtained is nuchared while hot and then cooled. The separated compound is recrystallized first from ethanol and then from methanol and forms pale yellow crystals having a melting point of 132–134° C.

*X-Nitro-Thienyl-(2)-o-Carboxy-Phenylsulfone (Formula 4)*

This compound is obtained by introducing, at a temperature of 0–5° C., thienyl-(2)-o-carboxy-phenylsulfide into fuming nitric acid. The reaction mixture is then heated up to a temperature of 40–45° C. and kept at this temperature for another 10 minutes, whereupon it is poured into water. The nitro-compound is precipitated. By recrystallizing the crude nitro compound from a mixture of dioxane-water, almost colorless crystals are obtained, which decompose at 182–184° C.

*5-Nitro-Thienyl-(2)-o-Carboxy-Phenylsulfide (Formula 5)*

To obtain this compound 8 g. of 2-iodi-5-nitrothiophene, 5 g. of thiosalicylic acid, 4.5 g. of finely powdered potassium carbonate free from water and 0.2 g. of copper acetate, together with 17 cc. of amyl alcohol are heated in an oil bath to 135–145° C. for 10 to 12 hours. Volatile ingredients are distilled in a current of steam, the residue is filtered off and the carboxylic acid in the filtrate is precipitated with dilute hydrochloric acid. After recrystallization from glacial acetic acid, it forms pale yellow crystals which melt at 233–234° C.

*2-Nitrothiophene (Formula 6) or 2-Nithothiophene-3-Sulfonic Acid Anilide (Formula 7)*

The compound of Formula 7 is obtained by heating for one hour, on a water-bath, the potassium salt of the 2-nitrothiophene-3-sulfonic acid with the same quantity (by weight) of phosphorous penta-chloride and precipitating the sulfochloride which is formed by pouring the reaction mixture into an ice-water mixture. The sulfochloride is triturated with 2 mols of aniline and by an exothermic reaction the sulfonic acid anilide corresponding to Formua 7 is formed. After recrystallization from ethanol the compound melts at 108° C.

*5-Nitrothiophene-2-Aldehyde (Formula 20) or 3-Nitro-Thionaphthene (Formula 8)*

For the production of the compound of Formula 8 thionaphthene is nitrated with fuming nitric acid in glacial acetic acid and, by means of steam-distillation, the nitrothionaphthene is obtained in the form of long yellow needles having a melting point of 69–70° C.

*2-Bromo-3-Nitro-Thionaphthene (Formula 9)*

3-nitrothionaphthene is treated with bromine in glacial acetic acid. The 2-bromo-3-nitro-thionaphthene melts at 70° C.

*2-Nitro-3-Bromo-Thionaphthene (Formula 10)*

To obtain this compound, thionaphthene is treated with bromine in chloroform, and then it is nitrated with fuming nitric acid in glacial acetic acid.

*3-Nitro-Thionaphthene-X-Sulfonic Acid Anilide (Formula 11)*

This compound is obtained analogously to the compound corresponding to Formula 7. The sulfonic acid chloride formed as an intermediate product melts at 160° C. After recrystallization from a benzene/gasoline-mixture the compound corresponding to Formula 11 melts at 174° C. after recrystallization from ethanol.

*5,5'-Dinitro-2,2'-Dithienyl (Formula 12)*

This compound is obtained from dithienyl which is nitrated with fuming nitric acid in glacial acetic acid anhydride. The dinitrocompound is precipitated by pouring the reaction mixture into water. It has a melting point of 144–145° C.

According to the invention, there can also be used, as the light-sensitive substance, the potassium salts of the following sulfonic acids. These potassium salts are dissolved in water, and then the aqueous solution is added to the colloidal solution.

*3-Nitro-Thionaphthene-X-Sulfonic Acid (Formula 13)*

This compound is obtained from 3-nitro-thionaphthene by treating it for 48 hours with 100% sulfuric acid at room-temperature. The thus obtained sulfonic acid is isolated in a known manner in the form of the potassium salt.

*2-Nitro-3-Bromo-Thionaphthene-X-Sulfonic Acid (Formula 14)*

This compound is obtained by sulfurizing the 2-nitro-3-bromo-thionaphthene with 100% sulfuric acid at 60° C. The sulfurizing process is finished after 1½ hours. The acid is isolated in the form of the potassium salt.

(2) Gelatin-pigment paper is bathed for 5 minutes in an ice-cooled 5% aqueous solution of the sodium- or ammonium-salt of the 4-nitro-thiophene-2-carboxylic acid corresponding to Formula 15, and then it is coated onto a glass plate and dried. When the light-sensitive gelatin-pigment paper (after it is separated from the glass-plate), is exposed to light for 5 minutes under a transparent film master, e.g. in the manner described in Example 1, the areas struck by light turn gradually brown. The exposed gelatin-layer is developed with water and then transferred onto a copper plate or copper cylinder, which is now etched in the manner usual in copper-intaglio printing, and by using one of the etching agents available therefor. A positive printing plate is obtained from a positive original.

The gelatin-pigment paper, sensitized according to the invention is distinguished by its good storageability. After 4 weeks of storage at an elevated temperature it has still the same sensitivity as on the day when it was sensitized. Instead of the salts of the 4-nitro-thiophene-2-carboxylic acid, the potassium salt of the 2-nitro-thiophene-3-sulfonic acid (corresponding to Formula 16) or the potassium salt of the 2-bromo-3-nitro-thionaphthene-X-sulfonic acid (corresponding to Formula 17) can be used, with the same good results for the sensitization of a gelatin-pigment paper.

The sodium salt of the 4-nitro-thiophene-2-carboxylic acid (Formula 15) is formed during neutralization of an aqueous suspension of the free acid with sodiumbicarbonate. The sodium salt becomes dissolved in the course of its formation. By concentrating the thus obtained solution under reduced pressure, the sodium salt is precipitated and can be isolated by filtration. In order to obtain the ammonium salt, the 4-nitro-thiophene-2-carboxylic acid is dissolved in ether and the salt is precipitated as a white powder by adding dry ammonia.

The 2-nitro-thiophene-3-sulfonic acid (Formula 16) is obtained by causing oleum (with an $SO_3$ content of 30%) to react on 2-nitro-thiophene. The 2-bromo-3-nitro-thionaphthene-X-sulfonic acid is produced by sulfurizing the 3-nitrothionaphthene with 100% sulfuric acid at 60° C. Both sulfonic acids are isolated in known manner in the form of the respective potassium salt.

(33) 0.1 g. of 2,3-diiodo-5-nitrothiophene (Formula 18) are dissolved (while heating) in 25 cc. of a 2% solution of polystyrene in o-dichlorobenzene. A mechanically roughened aluminum foil is coated with this solution by means of a plate-whirler, and is then dried in a warm air-current. The light sensitive layer is then exposed for 2–3 minutes under a transparent film-master in the manner described in Example 1, the light-brown image is developed by swabbing it slightly with a cotton pad soaked in cyclohexane, and the aluminum foil is finally washed with petroleum ether. The development can also be accomplished by repeatedly showering the exposed foil with cold benzene and washing with petroleum ether. The developed foil is wiped over with an acid solution, for inst. 0.6% phosphoric acid, to which some gum arabic was added, and after inking with greasy ink, it may be used as a printing plate for flat and offset printing. This printing plate can be used for a high run of copies.

As a support for the colloidal layer, a suitable paper foil, for example, a paper-foil, obtained according to U.S. Patent 2,534,588, can be used instead of an aluminum foil. The results are just as good.

If benzyl cellulose of medium viscosity is used instead of polystyrene, it is dissolved in a mixture of equal parts by volume of acetic acid ethyl ester and benzene. After exposure, the image is developed by bathing the exposed foil in acetic acid ethyl ester. The image background is cleaned by wiping over the layer with a cotton pad soaked with an acid solution, e.g. a 5% phosphoric acid containing some gum arabic.

If a positive printing plate is to be produced from a positive original, the developed foil is etched with a solution of ferric chloride, treated with lacquer, and the tanned colloid layer is finally removed.

The same good results are obtained by using the following compounds as light-sensitive substances:

*2-Iodo-5-Nitrothiophene (Formula 1) or 3,4-Dinitro-5-Bromo-Thiophene-2-Carboxylic Acid (Formula 19)*

The compound of Formula 19 is produced as follows: 5-bromo-thiophene-2-carboxylic acid is added at 0° C. to concentrated nitric acid. The reaction mixture is heated for 10 minutes at 40–45° C., and the dinitro compound is precipitated by pouring the mixture into ice water. After recrystallization from ethanol the dinitro compound melts at 135–136° C.

(4) A dried plate of cliché-zinc pretreated with pumice powder and prepared chalk is, by means of a plate-whirler, coated with a 2% solution of poly-styrene in o-dichlorobenzene, which also contains 0.4% of 2,3-diiodo-5-nitrothiophene (corresponding to Formula 18). After drying the coated plate in a warm air-current, it is exposed for 2 minutes under an original as described in Example 1, and the image is developed in the manner described in Example 3. In order to improve the visibility of the image obtained the plate can be bathed for a short time in a concentrated dyestuff solution, e.g. Sudan black (see Schultz, Farbstafftabellen, 7th edition, supplementary volume II, page 261) in o-dichlorobenzene, and then rinsed with water.

The zinc-plate is then deeply etched in the manner usual in the production of clichés, and a good cliché ready for printing is obtained.

(5) A dried copper plate, pretereated with pumice powder and prepared chalk, is coated with the light-sensitive polystyrene solution described in Example 4 and then dried. After drying the layer, the plate is exposed for 2 minutes under a screen-pattern in the manner described in Example 1 and then for another 3 minutes under a positive film-master. The image is developed as described in Example 3. The plate is then etched with a ferric chloride solution in the manner customary in the copper-intaglio printing process. After removing the colloidal layer, a good printing plate for autotype-intaglio printing is obtained.

If, instead of a copper plate, a bi-metal plate consisting of an aluminum plate with a copper layer thereon is used, a printing plate is obtained which is very well suited for printing long runs. The sensitizing and developing processes are the same as with the copper plate described above. The most suitable etching agent for this case is ferric nitrate.

(6) A light-sensitive solution is prepared by dissolving in 100 cc. of 96% alcohol, 0.4 g. of 2-iodo-5-nitrothiophene (the compound of Formula 1) and 2 g. of an interpolymer (produced by polymerizing a mixture consisting of 60 parts by weight of the adipic acid salt of hexamethylene diamine and 40 parts (by weight) of ε-caprolactam). This solution is coated onto a brushed aluminum foil by means of a plate whirler. After drying the solution applied to the foil, the light-sensitive layer is exposed under a positive photographic original to a light image, e.g. using a closed carbon arc lamp of 18 ampere at a distance of 70 cm. for 10 minutes. Subsequently, those parts of the layer which were not struck by light during exposure are removed by successive immersions of the plate into 60% aqueous ethyl alcohol at room temperature. Thus, from a positive original, a negative tanned image is obtained which may either serve as a protective layer for etching the foil with ferric chloride solution, or may be colored with suitable dyestuff solutions, such as methylene blue.

A similar tanner image is obtained when 0.4 g. of the sodium salt of 4-nitro-thiophene-2-carboxylic acid (the compound of Formula 15) are used instead of 0.4 g. of 2-iodo-5-nitro-thiophene. If the light-sensitive solution prepared with this compound is coated onto a support consisting of a transparent synthetic plastic material, e.g. a cellulose acetate foil, a distinctly visible tanned image is obtained which may also be colored.

We claim:

1. A presensitized printing plate comprising a flexible base material coated with a layer consisting essentially of an organic colloid and a nitrothiophene compound.

2. A presensitized printing plate according to claim 1 in which the colloid and nitrothiophene compound comprises a single layer.

3. A presensitized printing plate according to claim 1 in which the colloid and nitrothiophene compound are in separate layers.

4. A presensitized printing plate comprising a flexible base material coated with a layer comprising an organic colloid and a halogenated nitrothiophene compound.

5. A presensitized printing plate according to claim 4 in which the colloid and halogenated nitrothiophene compound comprise a single layer.

6. A presensitized printing plate according to claim 4 in which the colloid and halogenated nitrothiophene compound are in separate layers.

7. A presensitized printing plate comprising a flexible base material coated with a layer comprising an organic colloid and a α-β-benzo-nitrothiophene compound.

8. A presensitized printing plate according to claim 7 in which the colloid and α-β-benzo-nitrothiophene compound comprise a single layer.

9. A presensitized printing plate according to claim 7 in which the colloid and α-β-benzo-nitrothiophene compound are in separate layers.

10. A presensitized printing plate comprising a flexible base material coated with a layer comprising an organic colloid and a compound having the formula

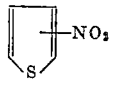

11. A presensitized printing plate comprising a flexible base material coated with a layer comprising an organic colloid and a compound having the formula

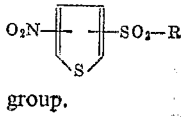

in which R is an aryl group.

12. A presensitized printing plate comprising a flexible base material coated with a layer comprising an organic colloid and a compound having the formula

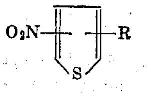

in which R is halogen.

13. A presensitized printing plate comprising a flexible base material coated with a layer comprising an organic colloid and a compound having the formula

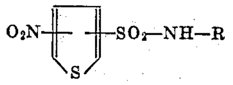

in which R is an aryl group.

14. A presensitized printing plate comprising a flexible base material coated with a layer comprising an organic colloid and a compound having the formula

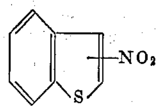

15. A presensitized printing plate comprising a flexible base material coated with a layer comprising an organic colloid and a compound having the formula

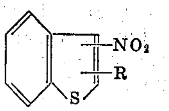

in which R is halogen.

16. A presensitized printing plate comprising a flexible base material coated with a layer comprising an organic colloid and a compound having the formula

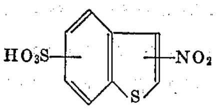

17. A presensitized printing plate comprising a flexible base material coated with a layer comprising an organic colloid and a compound having the formula

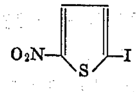

18. A presensitized printing plate comprising a flexible base material coated with a layer comprising an organic colloid and a compound having the formula

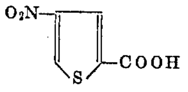

19. A presensitized printing plate comprising a flexible base material coated with a layer comprising an organic colloid and a compound having the formula

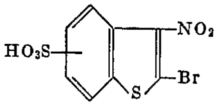

20. A presensitized printing plate comprising a flexible base material coated with a layer comprising an organic colloid and a compound having the formula

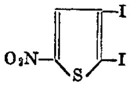

21. A presensitized printing plate comprising a flexible base material coated with a layer comprising an organic colloid and a compound having the formula

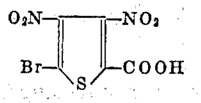

22. A process for developing a printing plate which comprises exposing to light under a master a flexible base material coated with a layer comprising an organic colloid and a nitrothiophene compound, and treating the light-exposed layer with a developer to remove the layer at the unexposed portions.

23. A process according to claim 22 in which the colloid and nitrothiophene compound comprise a single layer.

24. A process according to claim 22 in which the colloid and nitrothiophene compound are in separate layers.

25. A process for developing a printing plate which comprises exposing to light under a master a flexible base material coated with a layer comprising an organic colloid and a halogenated nitrothiophene compound, and treating the light-exposed layer with a developer to remove the layer at the unexposed portions.

26. A process according to claim 25 in which the colloid and halogenated nitrothiophene compound comprise a single layer.

27. A process according to claim 25 in which the colloid and halogenated nitrothiophene compound are in separate layers.

28. A process for developing a printing plate which comprises exposing to light under a master a flexible base material coated with a layer comprising an organic colloid and an $\alpha$-$\beta$-benzo-nitrothiophene compound, and treating the light-exposed layer with a developer to remove the layer at the unexposed portions.

29. A process according to claim 28 in which the colloid and $\alpha$-$\beta$-benzo-nitrothiophene compound comprise a single layer.

30. A process according to claim 28 in which the colloid and $\alpha$-$\beta$-benzo-nitrothiophene compound are in separate layers.

31. A process for developing a printing plate which comprises exposing to light under a master a flexible base material coated with a layer comprising an organic colloid and a compound having the formula

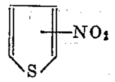

and treating the light-exposed layer with a developer to remove the layer at the unexposed portions.

32. A process for developing a printing plate which comprises exposing to light under a master a flexible base material coated with a layer comprising an organic colloid and a compound having the formula

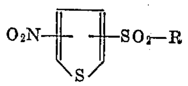

in which R is an aryl group and treating the light-exposed layer with a developer to remove the layer at the unexposed portions.

33. A process for developing a printing plate which comprises exposing to light under a master a flexible base material coated with a layer comprising an organic colloid and a compound having the formula

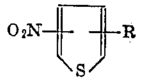

in which R is halogen and treating the light-exposed layer with a developer to remove the layer at the unexposed portions.

34. A process for developing a printing plate which comprises exposing to light under a master a flexible base material coated with a layer comprising an organic colloid and a compound having the formula

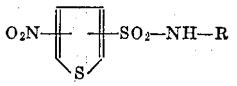

in which R is an aryl group and treating the light-exposed layer with a developer to remove the layer at the unexposed portions.

35. A process for developing a printing plate which comprises exposing to light under a master a flexible base material coated with a layer comprising an organic colloid and a compound having the formula

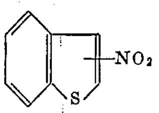

and treating the light-exposed layer with a developer to remove the layer at the unexposed portions.

36. A process for developing a printing plate which comprises exposing to light under a master a flexible base material coated with a layer comprising an organic colloid and a compound having the formula

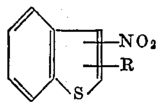

in which R is halogen and treating the light-exposed layer with a developer to remove the layer at the unexposed portions.

37. A process for developing a printing plate which comprises exposing to light under a master a flexible base material coated with a layer comprising an organic colloid and a compound having the formula

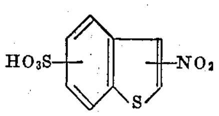

and treating the light-exposed layer with a developer.

38. A process for developing a printing plate which comprises exposing to light under a master a flexible base material coated with a layer comprising an organic colloid and a compound having the formula

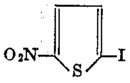

and treating the light-exposed layer with a developer to remove the layer at the unexposed portions.

39. A process for developing a printing plate which comprises exposing to light under a master a flexible base material coated with a layer comprising an organic colloid and a compound having the formula

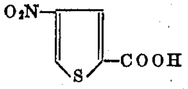

and treating the light-exposed layer with a developer to remove the layer at the unexposed portions.

40. A process for developing a printing plate which comprises exposing to light under a master a flexible base material coated with a layer comprising an organic colloid and a compound having the formula

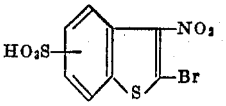

and treating the light-exposed layer with a developer to remove the layer at the unexposed portions.

41. A process for developing a printing plate which comprises exposing to light under a master a flexible base material coated with a layer comprising an organic colloid and a compound having the formula

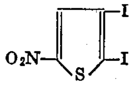

and treating the light-exposed layer with a developer to remove the layer at the unexposed portions.

42. A process for developing a printing plate which comprises exposing to light under a master a flexible base material coated with a layer comprising an organic colloid and a compound having the formula

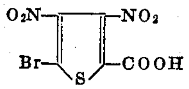

and treating the light-exposed layer with a developer to remove the layer at the unexposed portions.

References Cited in the file of this patent

UNITED STATES PATENTS

| | | |
|---|---|---|
| 2,610,120 | Minsk et al. | Sept. 9, 1952 |
| 2,732,301 | Robertson et al. | Jan. 24, 1956 |
| 2,751,296 | Minsk et al. | June 19, 1956 |
| 2,768,077 | Neugebauer et al. | Oct. 23, 1956 |

FOREIGN PATENTS

| | | |
|---|---|---|
| 434,073 | Great Britain | Aug. 26, 1935 |

OTHER REFERENCES

Hurd et al.: JACS, vol. 74, June 20, 1952, pp. 2965–70.

Rhodehamel et al.: Journal of American Pharmaceutical Association, vol. 31, 1942, pages 281–283. (Copy in Sci. Libr.)